May 24, 1955

C. A. JOHNSON 2,709,200

CIRCUIT TO ELIMINATE SPURIOUS COMPONENTS
OF TELEVISION CAMERA OUTPUT SIGNALS

Filed Feb. 4, 1949

Inventor:
C. A. JOHNSON
By J. O. Oliver,
Attorney

United States Patent Office 2,709,200
Patented May 24, 1955

2,709,200

CIRCUIT TO ELIMINATE SPURIOUS COMPONENTS OF TELEVISION CAMERA OUTPUT SIGNALS

Charles Alan Johnson, Twickenham, England, assignor to Electric & Musical Industries Limited, Hayes, England, a company of Great Britain Application February 4, 1949, Serial No. 74,587

Claims priority, application Great Britain February 11, 1948

4 Claims. (Cl. 178—7.2)

Figures 1, 2, 3:
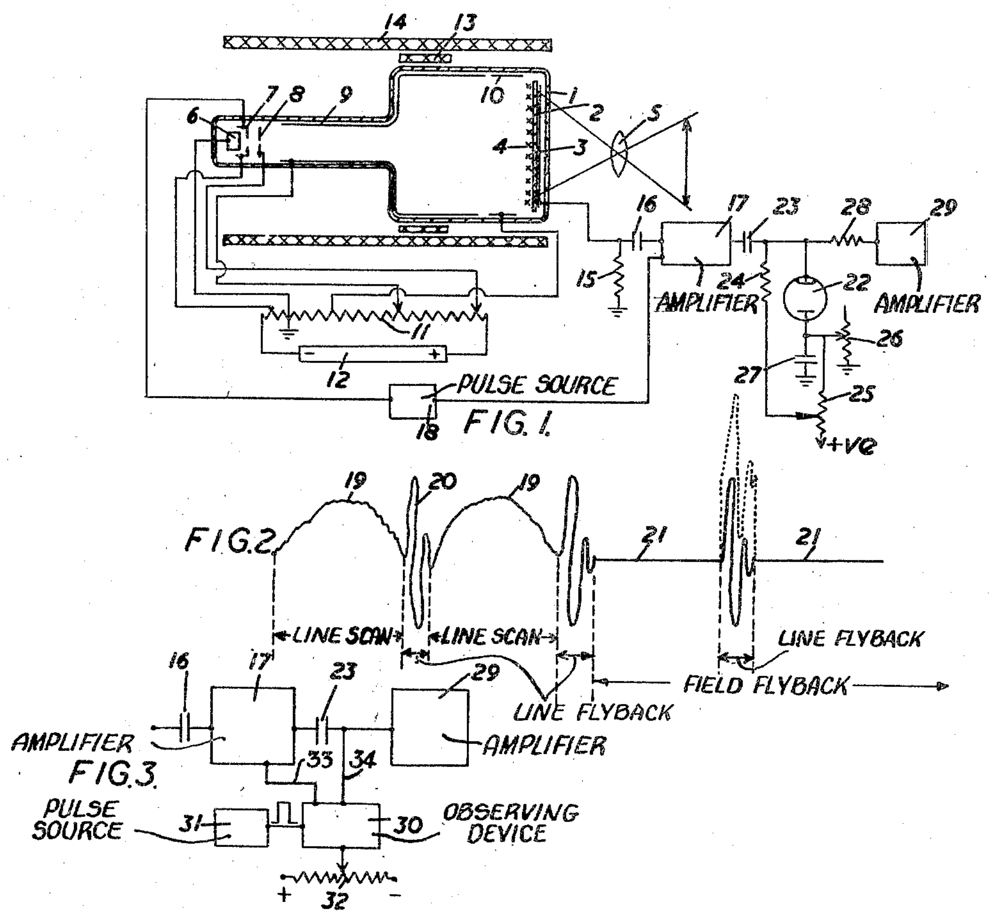

This invention relates to television or like transmitting systems.

In television systems the picture signals are usually generated by a pick-up tube and are usually fed through an amplifier employing A. C. couplings with the result that the D. C. and low frequency components of the signals are lost and consequently it is necessary to re-establish the D. C. level in the picture signals so that signals representing black in the picture signals correspond to a predetermined D. C. level.

In some types of pick-up tube the image for transmission is projected on to a photo-electric target electrode which is associated with a signal electrode and is arranged to be scanned by a high velocity electron scanning beam which serves to restore the elements of the target electrode to an equilibrium potential which corresponds substantially to that of an anode employed in the tube to accelerate the scanning beam. The picture signals which are generated in such a type of tube may not contain any signal corresponding to true black and hence when employing such tubes the black level is usually set manually by an operator. In another type of tube, however, instead of scanning the target electrode with a high velocity scanning beam the target electrode is scanned by a low velocity scanning beam so that the equilibrium potential of the elements of the target electrode is stabilised substantially at the potential of the cathode of the tube which generates the scanning beam. In such types of pick-up tube true black level corresponds to the condition when none of the current in the scanning beam is collected by the target electrode. When employing such pick-up tubes it is usually the practice to suppress the electron beam during certain intervals usually during the line and field fly-back periods, and hence during these periods there is available at the signal electrode an output having an average amplitude corresponding to picture black.

It is found, however, in such tubes that during line fly-back periods spurious signals of relatively large amplitude are picked up by the signal electrode owing to capacitative or inductive pick-up from the scanning coils associated with the pick-up tube and which mask the true black level set up when the beam is suppressed during line flyback periods in the latter type of tube. These spurious signals exist for substantially the whole of the line fly-back periods and hence the output from the signal electrode during these periods cannot satisfactorily be employed for reinserting lost D. C. components. During, however, portions of the field fly-back periods not coinciding with line fly-back periods, the output from said signal electrode is truly the representative of picture black and, in accordance with the present invention, an output obtained from said signal electrode during said portions is employed for reinserting lost low frequency and D. C. components.

In order that the said invention may be clearly understood and readily carried into effect, it will now be more fully described with reference to the accompanying drawings, in which:

Figure 1 illustrates diagrammatically a circuit arrangement of a television transmitting system together with means for re-inserting compensatory signals to compensate for lost low frequency and D. C. components in accordance with one embodiment of the invention, Figure 2 illustrates the waveform of television signals which are generated by the pick-up tube shown in Figure 1, and Figure 3 is a block diagram illustrating alternative means for re-inserting compensatory signals to compensate for low frequency and D. C. components which can be employed in the circuit shown in Figure 1.

In the circuit shown in Figure 1 picture signals are generated in a cathode ray pick-up tube 1, which comprises a target electrode composed of a transparent insulating layer such as glass or mica 2, having on one side a transparent signal electrode 3, and on the other side a multiplicity of photo-electric mosaic elements 4. An optical image of an object for transmission is projected through the transparent signal electrode 3 on to the mosaic elements 4 through a suitable optical lens indicated at 5. The mosaic elements are arranged to be scanned by a low velocity scanning beam which is generated by a suitably disposed electron gun. The electron gun comprises a cathode 6, a cathode shield 7, an apertured anode 8 and a further electrode 9 consisting of a metallic wall coating. The cathode 6 may be maintained at earth potential, the shield 7 at a negative potential with respect thereto, the anode 8 at a positive potential, and the electrode 9 usually at a slightly lower positive potential than the anode 8. Near to the target electrode is a decelerating electrode 10 which is maintained at a less positive potential than the electrode 9. The electrodes 6 to 10 are conventionally shown as deriving their potentials from a potentiometer 11 connected across a source of potential 12. The electron beam from the gun is accelerated by the anode 8 and decelerated by the electrodes 9 and 10 and is scanned over the surface of the target electrode at line and field frequencies by scanning coils indicated at 13. The electron beam is focussed by and is arranged to scan the mosaic elements in the presence of, a longitudinal magnetic field set up by a solenoid 14 and the arrangement is such that the beam is caused to impinge on the target electrode substantially normally throughout the whole scanning cycle. The pick-up tube shown in Figure 1 and the manner in which it operates is well known and when the mosaic elements are scanned, picture signals are set up across the signal resistance 15 connected to the signal electrode 3, said signals being fed through a condenser 16 to amplifier 17.

The electron beam from the cathode 6 is arranged to be suppressed during line and field fly-back periods for which purpose the shield 7 is supplied with suitable pulses from a source indicated at 18 so that during these periods no electrons from the cathode 6 are collected by the target electrode. The pick-up tube shown in Figure 1 during these periods provides an output in the signal electrode which has an average amplitude representative of picture black. It is found, however, that during the line fly-back periods spurious signals are picked up in the signal electrode 3 owing to capacitive or inductive pick-up from the scanning coils 13, with the result that these spurious signals tend to mask the black picture signals which would be generated in the signal electrode when the scanning beam is suppressed if spurious signals were not present.

Figure 2 of the drawings illustrates the waveform of signals set up in the signal electrode 3 and, as shown in this figure, the reference numeral 19 indicates picture signals generated during line scan periods and the reference numerals 20 indicate the spurious signals which are picked up by the signal electrode during line fly-back periods. During, however, the field fly-back periods, the output from the signal electrode 3 during periods which do not coincide with the line fly-back periods is truly representative of picture black, as indicated at 21. In accordance with one embodiment of the present invention, the output from the signal electrode 3 during the periods 21 is employed for the purpose of re-inserting compensatory signals to compensate for low frequency and D. C. components of the picture signals which may be lost when passing through the condenser 16 and the various stages of the amplifier 17. The re-inserting circuit shown in Figure 1 comprises a diode 22, which is arranged in known manner to re-insert the compensatory signals with reference to the minimum amplitude of the signals, that is to say, with reference to picture black. In this case, therefore, it is necessary to arrange that the portions of the spurious signals 20 which extend beyond the black signals 21 in the blacker-than-black sense should be prevented from affecting the operation of the diode 22. For this purpose the pulses from the source 18 which serve to suppress the cathode ray beam can also be applied, as shown, to the amplifier 17 so that the output of the amplifier 17 is also suppressed during occurrence of the spurious signals 20 so that the minimum amplitude of the signals fed to the diode 22 corresponds to picture black. Instead, however, of suppressing the output from the amplifier 17 during these periods, the pulses from the source 18 may be arranged to be of sufficient amplitude and to be superimposed on the spurious signals 20 so as to cause those portions of the spurious signals which extend in the blacker-than-black direction to be shifted above the black signals 21 as indicated by the dotted lines in Figure 2.

The output from the amplifier 17 is fed through a condenser 23 to the diode 22, the load resistance 24 of which is connected to a potentiometer 25 one end of which is connected to a suitable source of positive potential indicated by the sign +VC, whilst the other end of it is connected to a tapping point on a resistance 26, said tapping point also being connected to the anode of the diode, which latter is connected to earth through a large condenser 27. The adjustable tapping point on the resistance 26 and the potentiometer 25 serve to provide an adjustment whereby the D. C. level can be set at a desired value. The diode 22 functions in known manner to re-insert compensatory signals for any lost low frequency and D. C. components with reference to the black signals 21 and after re-insertion has been effected, the signals are passed through a resistance 28 to a further amplifier 29.

Figure 3 of the drawings illustrates a modification of the circuit shown in Figure 1 in which instead of suppressing the output of the amplifier 17 or employing pulses to shift the spurious signals 20, re-insertion is effected by employing a gating device 30 which is fed with pulses from a pulse generator 31 so that the device 30 is switched into operation at instants when the black signals 21 are present. Thus the pulses from the generator 31 are timed to coincide with the occurrence of the black signals 21, i. e. when the spurious signals are not present. The device 30 may be the valve 29 shown in Figure 5 of United States Patent No. 2,328,946. Signals from the amplifier 17 of the present Figure 3 are fed via lead 34 to the outer control grid of valve 29 and the pulses from the source 31 which are timed to coincide with the periods when the black level signals 21 are present are fed to the inner control grid of the valve 29. This valve is thus switched into operation by the pulses from the source 31 only when the black level signals 21 are present. The output from the valve 29 is employed after smoothing as described at line 4, et seq., in column 2 on page 3 of said United States patent as a compensatory signal for the lost low frequency and D. C. components, said compensatory signal being then utilised as described in said patent as by feeding said compensatory signal via lead 33 to amplifier 17. The level of the compensatory signal obtained from the valve 29 may be set by coupling the device 30 to a tapping point on a potentiometer 32. Alternatively, instead of using an observing device 30 the "clamp" method of D. C. re-insertion described in the specification of United States Patent No. 2,190,753 may be employed. In applying the arrangement shown in Figure 3 to Figure 1, the pulse source 18 and the elements 16, 17 and 22 to 29 shown in Figure 1 will be replaced by the elements shown in Figure 3.

What I claim is:

1. A television or like transmitting system comprising a pick-up tube having a target electrode associated with a signal electrode, a cathode to generate a beam of electrons to scan said target electrode at a low velocity to generate vision signals, means for maintaining said cathode at a predetermined potential, means for deflecting said beam to scan said target electrode at line and field frequencies to stabilise said target electrode at a potential corresponding substantially to the potential of said cathode, means for suppressing said beam of electrons during line and field flyback periods to generate, during field flyback periods in said signal electrode, signals having an amplitude level corresponding to picture black, spurious signals being unavoidably superimposed on said signals of said level during line flyback periods, means for reinserting compensatory signals to compensate for low frequency and direct current components of said vision signals which may be lost in said system, and means for applying to said reinserting means to effect reinsertion an output from said signal electrode corresponding to picture black which occurs only during a portion of said field flyback periods not coinciding with line flyback periods.

2. A television or like transmitting system comprising a pick-up tube having a target electrode associated with a signal electrode, a cathode to generate a beam of electrons to scan said target electrode at a low velocity to generate vision signals, means for maintaining said cathode at a predetermined potential, means for deflecting said beam to scan said target electrode at line and field frequencies to stabilise said target electrode at a potential corresponding substantially to the potential of said cathode, means for suppressing said beam of electrons during line and field flyback periods to generate, during field flyback periods, in said signal electrode, signals having an amplitude level corresponding to picture black, spurious signals being unavoidably superimposed on said signals of said level during line flyback periods, means for reinserting compensatory signals to compensate for low frequency and direct current components of said vision signals which may be lost in said system, an amplifier, means for feeding all of said signals to said amplifier, a source of pulses recurring at line flyback frequency, means for applying said pulses to suppress the output of said amplifier during line flyback periods, and means for applying to said reinserting means to effect reinsertion an output from said signal electrode corresponding to picture black which occurs only during a portion of said field flyback periods not coinciding with line flyback periods.

3. A television or like transmitting system comprising a pick-up tube having a target electrode associated with a signal electrode, a cathode to generate a beam of electrons to scan said target electrode at a low velocity to generate vision signals, means for maintaining said cathode at a predetermined potential, means for deflecting said beam to scan said target electrode at line and field frequencies to stabilise said target electrode at a potential corresponding substantially to the potential of said cathode, means for suppressing said beam of electrons during line and field flyback periods to generate, during field flyback periods in said signal electrode, signals having an amplitude level corresponding to picture black, spurious signals being unavoidably superimposed on said signals of said level during line flyback periods, means for reinserting compensatory signals to compensate for low frequency and direct current components of said vision signals which may be lost in said system, an amplifier, means for feeding all of said signals to said amplifier, a source of pulses occurring at line flyback periods, means for superimposing said pulses on the output of said amplifier during line flyback periods to cause said spurious signals to be shifted with the minimum amplitude of the resultant signals corresponding to picture black, and means for feeding to said reinserting means an output from said signal electrode corresponding to picture black which occurs only during a portion of said field flyback periods.

4. A television or like transmitting system comprising a pick-up tube having a target electrode associated with a signal electrode, a cathode to generate a beam of electrons to scan said target electrode at a low velocity to generate vision signals, means for maintaining said cathode at a predetermined potential, means for deflecting said beam to scan said target electrode at line and field frequencies to stabilise said target electrode at a potential corresponding substantially to the potential of said cathode, means for suppressing said beam of electrons during line and field flyback periods to generate during field flyback periods in said signal electrode signals having an amplitude level corresponding to picture black, spurious signals being unavoidably superimposed on said signals of said level during line flyback periods, means for reinserting compensatory signals to compensate for low frequency and direct current components of said vision signals which may be lost in said system, said reinserting means including a gating device, a source of pulses, and means for applying said pulses to said gating device to switch said gating device into operation only during portions of said field flyback periods which do not coincide with line flyback periods.

References Cited in the file of this patent

UNITED STATES PATENTS

| | | |
|---|---|---|
| 2,190,753 | Browne | Feb. 20, 1940 |
| 2,299,328 | Kell | Oct. 20, 1942 |
| 2,307,375 | Blumlein | Jan. 5, 1943 |
| 2,309,764 | Gottier | Feb. 2, 1943 |
| 2,315,388 | Bedford | Mar. 30, 1943 |
| 2,328,946 | Blumlein | Sept. 7, 1943 |
| 2,426,710 | Sanders | Sept. 2, 1947 |
| 2,451,640 | Thalner | Oct. 19, 1948 |